Dec. 21, 1965         M. R. JEZO         3,224,813
CONVEYING APPARATUS
Filed Aug. 29, 1963                      2 Sheets-Sheet 1

INVENTOR.
M. RICHARD JEZO
BY
Andrus & Starke
ATTORNEYS

Dec. 21, 1965    M. R. JEZO    3,224,813
CONVEYING APPARATUS
Filed Aug. 29, 1963    2 Sheets-Sheet 2

INVENTOR.
M. RICHARD JEZO
BY
Andrus & Starke
ATTORNEYS

United States Patent Office 3,224,813
Patented Dec. 21, 1965

3,224,813
CONVEYING APPARATUS
Martin Richard Jezo, 11710 W. Hayes Ave.,
West Allis, Wis.
Filed Aug. 29, 1963, Ser. No. 305,297
3 Claims. (Cl. 302—49)

This invention relates to an apparatus for handling and conveying materials and more particularly to a pneumatic conveyor for conveying finely divided dry material.

Finely divided or pulverized materials, such as cement, clay, lime, grain and the like are transported and stored in large bins or hoppers, and the material is usually conveyed from the storage bin by a pneumatic conveyor. With the usual pneumatic conveying system, the material is introduced in a stream of high velocity air and conveyed by the air stream to the desired location. Unless the storage bin is completely sealed, the high pressure air often flows back through the bin and carries the dry pulverized material outwardly through cracks in the bin. This problem of dusting of the pulverized material is particularly evident in unloading railway hopper cars. In this situation, the bottom of the hopper is enclosed by a loose fitting slide gate and in order to prevent the pulverized material from being blown out through the cracks surrounding the slide gate, it is necessary to plug and seal all cracks and openings in the hopper before the material can be discharged and conveyed. If the sealing is not done, the pulverized material will blow outwardly through the cracks which results not only in a waste of the material, but results in a harmful or toxic atmospheric condition for workmen in the area. Thus, in the normal conveying operation, the cracks around the slide gate are sealed by hand, and this is a time consuming and difficult task.

The present invention is directed to an apparatus for conveying and handling dry, finely divided material which eliminates the dusting problem. More specifically, a supply chute is connected to the lower end of the railway car hopper below the slide gate and the bottom end of the chute communicates with a feed assembly. The feed assembly includes a series of rotating vanes which are mounted for rotation within a feed chamber, and the chamber in turn communicates with a pipeline through which air moves at a high velocity. The rotating vanes define a series of material-receiving compartments and as the vanes rotate, each successive compartment is filled with material from the supply chute and rotated to a position where the material is dumped into the pipeline and conveyed away by the air stream.

To prevent high pressure air from the pipeline from passing upwardly through the feed assembly into the supply chute, an air vent mechanism is connected to the feed assembly and located ahead of the supply chute. The pressure of the air within each compartment is relieved to atmospheric pressure before each individual compartment moves into communication with the supply chute so that the air in the compartment will not blow through the mass of material and cause dusting problems.

The pressure venting mechanism to be employed is an air permeable member, such as the bag or hose, and the air within the compartment blows upwardly through the hose and passes through the hose while the dry material will be retained within the hose.

The conveying apparatus of the invention eliminates the problem of dusting of the fine material into the atmosphere, without the necessity of sealing the various cracks and other openings in the hopper and slide gates. By preventing dusting, the loss or waste of the conveyed material is minimized and this is particularly important since in the conventional conveying operation, the waste may be as high as 5% to 10% of the conveyed material. In addition, by preventing dusting, the atmosphere surrounding the car is not contaminated which eliminates any toxic problems for workmen in the area.

Furthermore, as the unloading of the hopper car can be carried on without sealing the cracks and openings, a considerable time and labor saving results which reduces the overall cost of the unloading operation.

Other objects and advantages will appear in the course of the following description.

Figure 1:
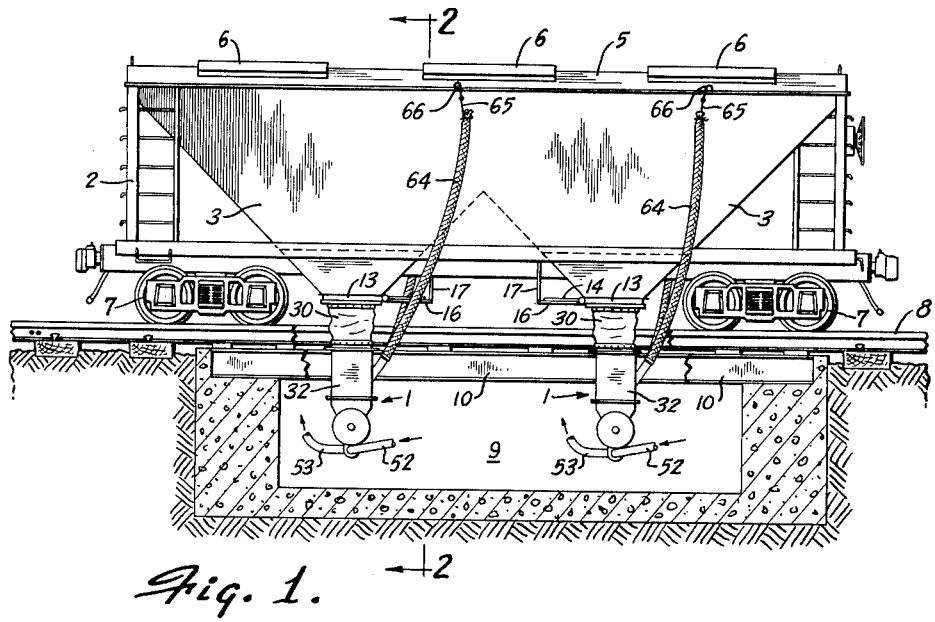
FIG. 1 shows the conveying apparatus of the invention as associated with a railway hopper car.

FIG. 1 shows a pair of conveying units 1 to be used for conveying dry, pulverized material, such as cement, lime, soda ash and grain and the like, associated with a conventional railway hopper car 2. The car 2 includes four hoppers 3, and the material 4 to be unloaded flows by gravity to the discharge outlet at the bottom of each hopper. The hoppers 3 are enclosed by a top 5 having a series of hatches 6 through which the material is introduced into the hoppers.

The railway car 2 is supported by a pair of wheel units 7 which ride on rails 8. To unload the material 4 from the car 2, the car is positioned over a pit 9 formed of concrete or the like and the conveying units 1 are located within the pit beneath grade level. A pair of beams 10 extends across the pit and supports the rails 8.

Figure 3:
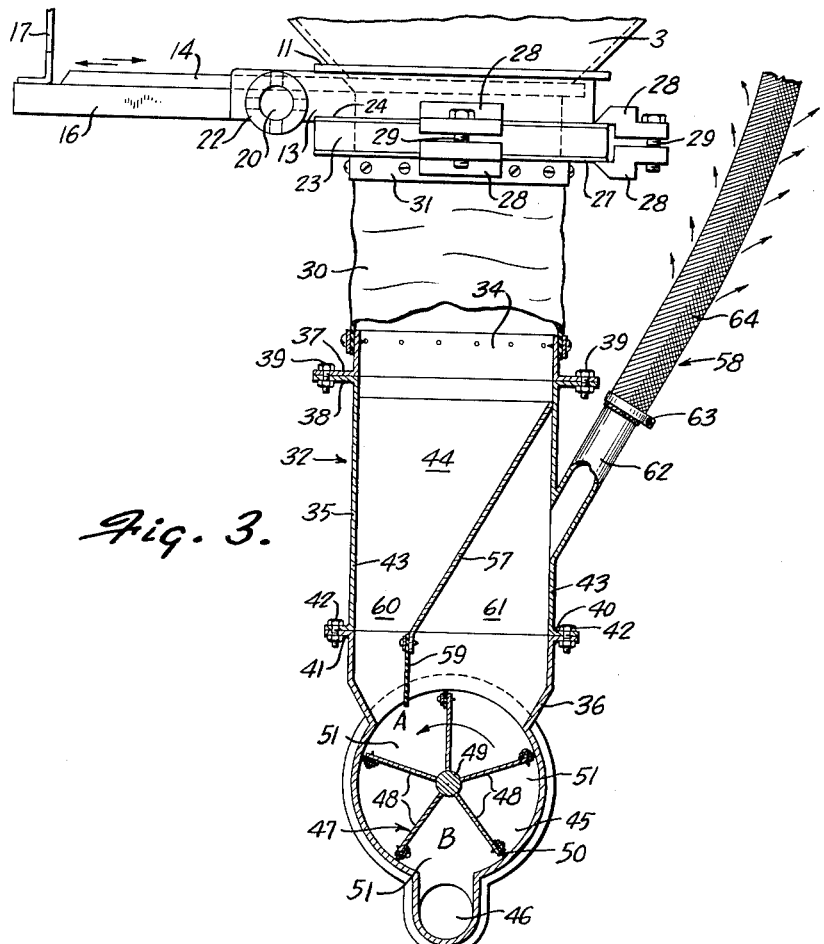
FIG. 3 is an enlarged side elevation with parts broken away in section showing the conveying unit.
Figure 4:
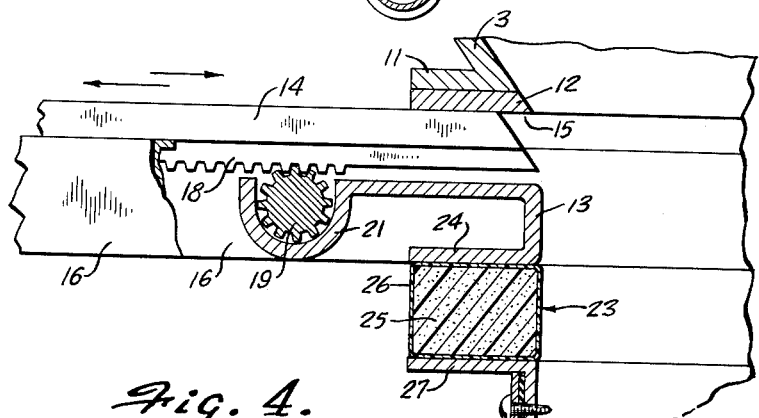
FIG. 4 is an enlarged fragmentary view showing the construction of the slide gate and the conveying unit seal.

As best shown in FIGS. 3 and 4, each hopper is provided with a generally rectangular outlet which is bordered by a flange 11. The flange 11 is secured to an outwardly extending flange 12 formed on a casting 13.

The outlet of each hopper 3 is adapted to be closed by a slide gate 14 which is slidable within a slot 15 formed in the respective casting 13. The slide gate 14 is guided in movement on a pair of angle-shaped guide bars 16 which extends outwardly from the casting 13. The outer ends of each pair of guide bars 16 are supported by a bracket 17 which extends upwardly and is connected to the respective hopper 3.

To open and close the slide gate 14, a rack 18 is secured to the undersurface of each of the slide gates and is engaged by a pinion 19 carried by shaft 20. The shaft 20 is journaled within the guide bars 16 and the casting 13 is provided with an extension 21 which provides a shield or covering for the pinion. The outer end of the shaft 20 is provided with a knob 22 having a series of openings which can be engaged by a suitable lever to rotate the shaft and thereby move the slide gates in or out with respect to the opening in the hopper.

The conveying unit 1 associated with each of the hoppers 3 includes a generally rectangular sealing member 23 which bears against the lower surface of the flange 24 on the casting 13. The sealing members 23 are provided with a central core 25 formed of a cellular plastic material, such as polyurethane foam, which is coated or enclosed with a thermoplastic material 26, such as polyvinyl chloride. The lower surface of the sealing member 23 bears against the upper flange of a rectangular support 27 and the flanges 11 and 27 are secured together by a series of clamps 28 joined together by bolts 29.

A flexible boot 30 made of canvas, rubber or the like extends downwardly from each of the support members 27. The upper end of the boot 30 is secured to the support member 27 by a retaining ring 31 and the lower end of each pair of boots 30 communicates with a supply hopper or chute assembly 32 and the boot is secured to the chute assembly 32 by means of a retaining ring 33.

Each supply chute 32 includes a pair of generally rectangular upper sections 34, a single central section 35 and a lower feed section 36. The upper sections 34 are provided with flanges 37 which are secured to the flange 38 of the central section 35 by bolts 39. Similarly, the lower edge of the central section 35 is provided with a flange 40 which is secured to the flange 41 of the lower feed section 36 by bolts 42.

Figure 2:
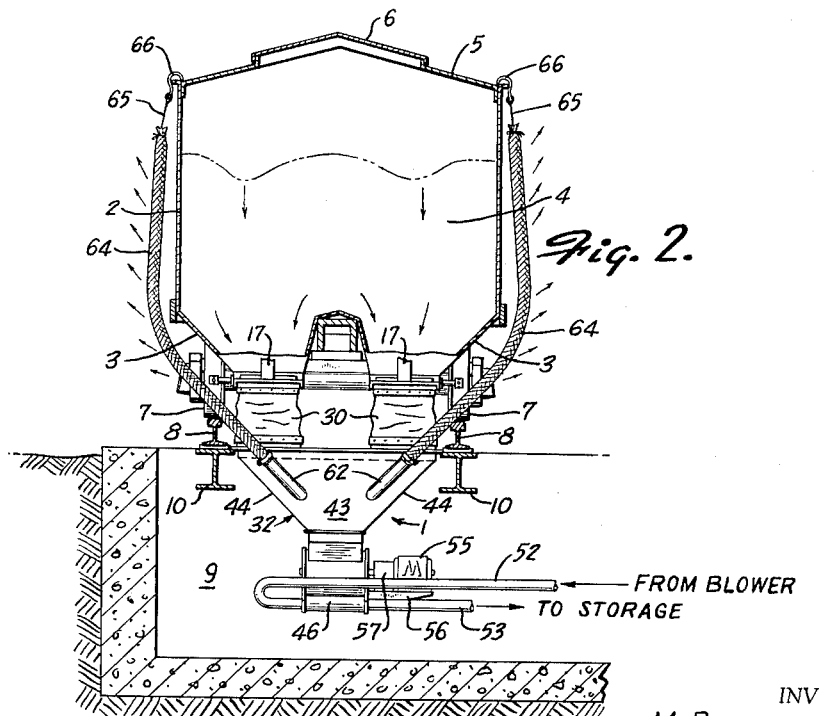
FIG. 2 is a transverse section taken along line 2—2 of FIG. 1.

As best shown in FIGS. 2 and 3, the central section 35 is provided with a pair of generally parallel side walls 43 and a pair of downwardly converging end walls 44. The lower section 36 defines a generally cylindrical feed chamber 45 which communicates with an air passage 46 formed in the lower end of the section 36. A rotatable feed member 47 is mounted within chamber 45 and includes a series of radially extending vanes 48 which extend outwardly from a central shaft 49. The outer tip of each of the vanes 48 is provided with a flexible wiper strip 50 which is adapted to engage the walls of the chamber 45 and provide a sealing action.

The vanes 48 define a series of sector-shaped compartments 51 and the dry material moving downwardly through the supply chute 32 is adapted to be successively received in each of the compartments and on rotation of the feed member 47, the material is dumped from the compartment into the air passage 46. One end of the air passage 46 is connected by conduit 52 to a source of air or other gas under pressure, while the other end of the air passage 46 is connected by conduit 53 to a storage location.

The air or other gas moves through the conduits 52 and 53 with a high velocity and the pressure of the air is generally in the range of 8 to 20 p.s.i. gauge. As the vanes 48 rotate, the material is dumped from each compartment 51 into the air passage 46 and is carried along in the stream of air through the conduit 53 to the storage location.

The feed member 47 is rotated by a motor 54 mounted on bracket 55 attached to the lower section 36. The motor operates through a suitable speed reducer 56 to rotate the shaft 49 and vanes 48 at the desired rate of speed.

During operation of the conveying apparatus, the material falls from compartment B, shown in FIG. 3, into the air passage 46. After the compartment B is emptied, it will be filled with air from passage 46 which is at a pressure greater than atmospheric. The compartment B is rotated in the direction of the arrow in FIG. 3 to the supply chute, and in the conventional conveying apparatus, the high pressure air in compartment B would normally tend to blow upwardly through the supply chute 32 and be discharged through any cracks or crevices in the chute or the hopper 3. To prevent this blowout and dusting of the dry material into the atmosphere, a baffle 57 and air venting mechanism 58 are mounted within the supply chute 32. The baffle 57 extends between the end walls 44 and slopes downwardly from one side wall across the center line of the chute and terminates at a position between the center line and the opposite side wall. The lower end of the baffle is provided with a flexible wiper element 59 which projects downwardly into the path of the tips of the vanes 48 so that the vanes 48 will strike and flex the wipers 49 during rotation to provide a sealing action. The baffle 57, in combination with the chute 32 defines a feed supply chamber 60 and an air vent chamber 61.

To relieve the pressure of the air within the compartments 51 after the material has been dumped from the compartments into air passage 46, a tubular member 62 is secured to the side wall of the chute 32 and communicates with the air vent chamber 61. The tube 62 extends upwardly from the chamber 61 and is connected by a coupling 63 to an air permeable hose or bag 64. The upper end of the hose 64 is closed off and is supported by a rope 65 from a hook 66 which is attached to the railway car 2.

The hose 64 is formed of an air permeable material, such as canvas, cotton or the like, which will permit the free movement of air therethrough but will prevent the movement of the dry material therethrough.

In operation, the material contained within the hoppers 3 passes downwardly by gravity through the boots 30 and into the feed supply chamber 60 of the supply chute 32 and then into the compartment indicated by A in FIG. 3. The compartment A is then rotated downwardly and the material is dumped into the air passage 46. Simultaneously, the next succeeding compartment is rotated into position beneath chamber 60 and is filled with the dry material. As each of the compartments 51 is rotated upwardly after discharging the material into the air passage 46, the high pressure air contained within each compartment passes upwardly through the air vent chamber 61 and into the hose 64 where the air is vented to the atmosphere. Any dry, powdery material entrained within the air which is moving upwardly within the air vent chamber 60 is trapped within the hose and will not pass out to the atmosphere.

As the air vent chamber 61 is located ahead of the material supply chamber 59 in the direction of rotation of the feed member 47, the pressure of the air will be relieved to atmospheric pressure before the compartment reaches the material supply chamber 60 so that the material can fall into the chamber 51 without the air blowing upwardly through the mass of material. This prevents dusting or blowout of the dry, pulverized material and eliminates waste. Any dry material trapped within the hose 64 can be readily returned to the feed unit by merely shaking the hose after the conveying operation.

The conveying apparatus of the invention can be readily installed with railway hopper cars or other storage bins and the material can be unloaded without the necessity of stuffing the cracks and other crevices in the hopper. This substantially reduces the overall time of unloading and eliminates waste and hazardous atmospheric conditions in the area.

While the above description is directed to the use of the conveying apparatus in conjunction with unloading a railway hopper car, the apparatus can be used for the pneumatic unloading of any storage bin containing dry, pulverized material and is particularly adaptable to those applications where the storage bin may contain cracks or crevices through which blowout or dusting is a problem.

Various modes of carrying out the invention are contemplated as being within the scope of the following claims particularly pointing out and distinctly claiming the subject matter which is regarded as the invention.

I claim:

1. An apparatus for handling and conveying dry granular material, comprising a hopper having a pair of side walls and a pair of end walls and having an opening in the bottom whereby dry granular material is discharged by gravity through said opening, feed means communicating with the opening in the hopper and including a series of rotatable vanes defining a series of material receiving compartments, said vanes being rotatable about an axis disposed generally perpendicular to said end walls, a baffle extending between the end walls of the hopper and diverging downwardly toward one of the side walls to define a material feeding chamber, the bottom end of said sloping baffle being spaced from said side wall to provide an outlet communicating with said feed means, said baffle defining an air vent chamber with said opposite side wall of the hopper with said air vent chamber communicating with said feed means, and an elongated air permeable bag extending outwardly from said hopper and communicating with the air vent chamber, said bag being formed of a porous material to permit air to pass freely therethrough and to prevent the dry material from passing therethrough.

2. The structure of claim 1 in which the lower edge of said baffle is provided with a flexible tip and extends downwardly and intersects the arc inscribed by the outer ends of said rotating vanes whereby each vane during rotation engages and flexes said tip.

3. An apparatus for handling and conveying finely divided material, comprising a storage bin having a discharge outlet in the bottom thereof, closure means for selectively opening and closing said discharge outlet, a hopper removably attached to the bin and communicating with said discharge outlet, a hollow feed member communicating with the bottom of the hopper with said feed member having a well in the lower end thereof, a pipeline connected to the well and adapted to conduct a stream of air therethrough, a series of rotatable vanes disposed in the feed member and defining a series of material-receiving compartments, an elongated air permeable bag disposed outside of the hopper and having one end communicating with said feed member at a location ahead of said hopper, in the direction of rotation of said vanes, said bag serving to vent the pressure of the air in each compartment to atmospheric pressure before the compartment rotates into communication with the hopper, and means for removably connecting the opposite end of the bag to the storage bin.

References Cited by the Examiner
UNITED STATES PATENTS

| | | | |
|---|---|---|---|
| 2,264,513 | 12/1941 | Dutro | 302—49 |
| 2,293,871 | 8/1942 | Whitfield | 302—49 |
| 2,652,687 | 9/1953 | Yellott | 302—49 |
| 2,757,049 | 7/1956 | Temple | 302—49 |
| 2,946,626 | 7/1960 | Atkinson | 302—49 |
| 3,009,744 | 11/1961 | Lenhart | 302—49 |
| 3,053,577 | 9/1962 | Ungashick | 302—49 |

SAMUEL F. COLEMAN, *Primary Examiner.*
ANDRES H. NIELSEN, *Examiner.*